United States Patent [19]
Zook

[11] 3,938,258

[45] Feb. 17, 1976

[54] VERTICAL REFERENCE DEVICE

[75] Inventor: James K. Zook, Moorestown, N.J.

[73] Assignee: AII Systems, Inc., Moorestown, N.J.

[22] Filed: Jan. 8, 1974

[21] Appl. No.: 431,640

[52] U.S. Cl. ..................... 33/366; 33/300; 33/391; 73/515
[51] Int. Cl.² ............................................. G01C 9/08
[58] Field of Search ........... 333/366, 300, 301, 333, 333/343, 351, 391, 367, 381, 365; 73/515; 235/193, 184

[56] References Cited
UNITED STATES PATENTS

| | | | |
|---|---|---|---|
| 2,474,116 | 6/1949 | Rendel | 235/193 |
| 2,921,380 | 1/1960 | Savet | 33/366 |
| 3,047,962 | 8/1962 | Jorgensen | 33/366 |
| 3,739,364 | 6/1973 | Talkington et al | 33/366 |

*Primary Examiner*—William D. Martin, Jr.
*Attorney, Agent, or Firm*—Seidel, Gonda & Goldhammer

[57] ABSTRACT

First and second inclinometers are mounted above the deck of a ship at different distances from the ship's center of gravity. Each inclinometer generates a signal in response to the angular movement of said ship with respect to the true vertical. The difference between the signals is multiplied by a factor which is proportional to the ratio of the distance from the higher inclinometer to the center of gravity to the distance between the inclinometers. This product is then subtracted from the electrical signal generated by the higher inclinometer resulting in a signal which is proportional to the roll or pitch angle of the ship.

15 Claims, 8 Drawing Figures

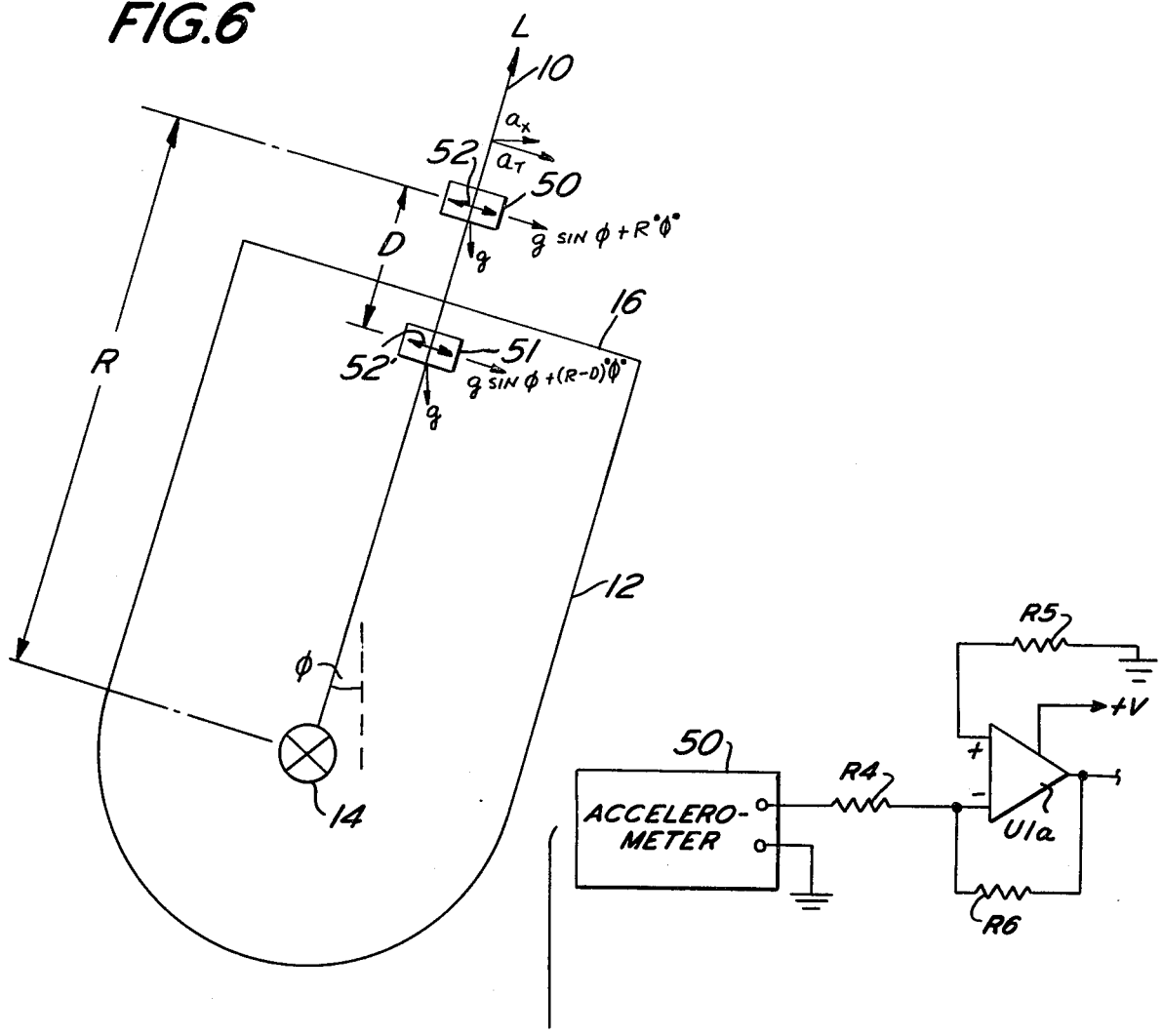
FIG.6
FIG.7
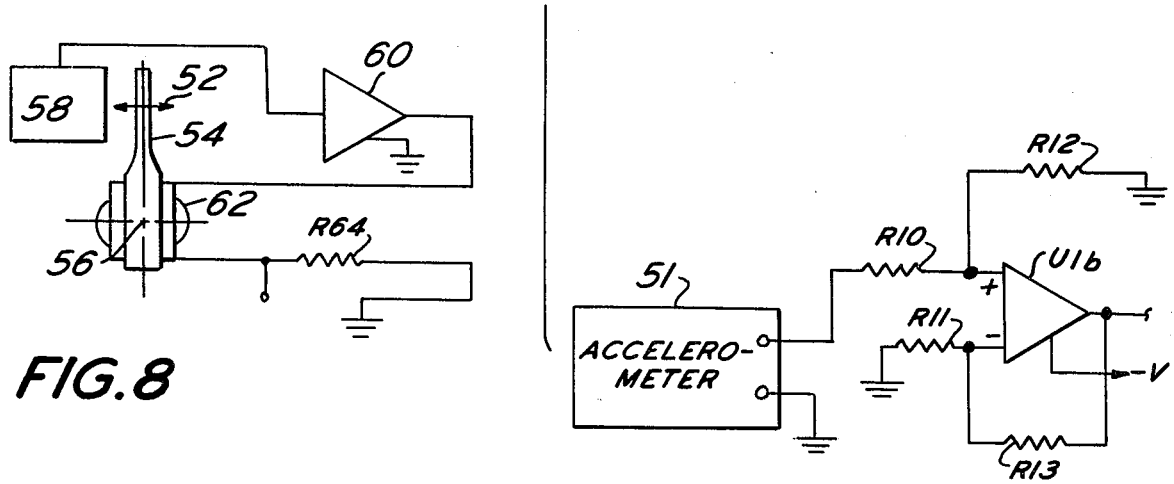
FIG.8

VERTICAL REFERENCE DEVICE

This invention relates to a vertical reference device and more particularly to a vertical reference device which corrects for errors due to the acceleration of the support upon which the device is mounted.

In order for a ship at sea to communicate with a satellite, such as a synchronous satellite, it is necessary that the ship's antennae be continuously directed at the satellite. Ships at sea, however, are subject to pitch and roll, which motions affect the angular position of the ship with respect to the true vertical. Accordingly, as a ship rolls or pitches, anything mounted on the ship such as an antenna would also become angularly offset from the true vertical. Therefore, in order for the ship to maintain continuous communications with a satellite, it becomes necessary to move the ship's antennae an equal amount, but in the opposite direction, relative to the ship as the ship rolls or pitches. In other words, it is necessary that the antennae be maintained at a constant angle relative to the true vertical even when the ship rolls or pitches.

Presently, this is accomplished by mounting the antennae on a pivotable support platform and maintaining the attitude of the support platform stable with the use of one or more gyroscopes and associated servo systems. These gyroscopes, however, are extremely expensive and have a life expectancy of approximately one year or less. As a result, alternative means for accomplishing the same result as the gyroscope have been sought for some time.

One alternative to the gyroscope, which has been proposed, is an inclinometer in the form of a pendulum supported by the deck of the ship or some structure rigidly secured to the deck. The theory is that as the ship rolls or pitches the pendulum will remain in the true vertical direction and therefore the angle between the pendulum and a reference means perpendicular to the deck of the ship will be representative of the amount of pitch or roll of the ship. This arrangement, however, is extremely inaccurate since the pendulum does not actually remain in the true vertical position. This is due to the fact that a pendulum is sensitive to accelerations of its support and these accelerations will result in errors in the vertical indication. Thus, if a ship rolls 15° the acceleration on the pendulum may result in an indication that the ship has rolled 17° or possibly 20°. In other words, the pendulum would indicate an apparent angular position which would be in error from the true angular position by several degrees.

Other types of inclinometers, such as accelerometers which are sensitive to the acceleration due to gravity, are also known. These devices have a zero-output when their sensitive axis is horizontal. As the inclinometer is tilted, the component of gravity along the sensitive axis increases in proportion to the sine of the angle between the sensitive axis and the gravitational axis, causing an output to be generated which is proportional to the component of gravity along the sensitive axis. However, since these devices are also sensitive to the accelerations of the bodies on which they are mounted, their outputs will not be proportional to the tilt angle but will be in error by an amount proportional to this acceleration. In other words, when such a device is used on a ship, its output may indicate an apparent roll of 17° to 20° when the ship has actually rolled only 15°. This error, due to the acceleration of the structure which supports the inclinometer, must therefore be corrected if such devices are to be useful.

Various proposals have been advanced in the past for performing this compensation in pendulum type systems. In one such proposed arrangement, the velocity of the ship in the direction along the sensitive axis of the pendulum is first measured and converted into an electrical signal. The velocity signal is then transmitted through a time delay unit and the difference between the instantaneous velocity signal and the time delay signal is subtracted from the pendulum output. It has also been proposed to mount an accelerometer on the deck of the ship or on the pendulum. The output of the accelerometer would then be subtracted from the output signal generated by the pendulum. Neither of these proposals, however, is satisfactory particularly for inexpensive pendulum type systems. While each proposal does increase the accuracy of a pendulum type vertical indicator, it also greatly increases the cost of the device. This is because velocity indicators and accelerometers sensitive enough to be used with these systems are expensive. Furthermore, as described above, such accelerometers are sensitive not only to the acceleration of the pendulum support, but also to the acceleration due to gravity. This creates additional errors which must be corrected.

Accordingly, it is an object of the present invention to provide an inexpensive but accurate pendulum vertical reference device.

It is another object of the present invention to provide a vertical reference device employing inclinometers wherein angular errors due to acceleration of the inclinometers are substantially reduced.

A further object of the present invention is to provide a means for compensating for the errors in a vertical reference device employing inclinometers caused by the acceleration of the inclinometers.

The present invention accomplishes these objects by providing two inclinometers which are mounted above the deck of a ship at different distances from the ship's center of gravity or center of roll. Each inclinometer generates a signal in response to the angular movement of the ship with respect to the true vertical and the difference between these signals is then multiplied by a predetermined factor. This factor is proportional to the ratio of the distances from the higher inclinometer to the center of gravity to the distance between the two inclinometers. This product is then subtracted from the signal generated by the higher inclinometer and the result is a signal which is proportional to the roll or pitch angle of the ship.

Further objects, advantages and novel features of the present invention will become apparent from a consideration of the following description taken in conjunction with the accompanying drawings which illustrate presently preferred forms of the invention; it being understood, however, that this invention is not limited to the precise arrangements and instrumentalities shown.

For example, while the following description refers to a vertical reference device for use on a ship or buoy it should be understood that the device could be used on any land, air or water craft, mechanism or other body which is subject to relatively slow pivotal movements about a substantially horizontal axis. In addition, the present invention is useful for stabilizing any device mounted on the pivotable body which can be moved by a servo control mechanism. Accordingly, reference to shipboard antennae should be considered only as one example of the uses of the invention. Gun mounts, cameras, telescopes and transits could also be stabilized by the instant invention.

FIG. 6 is an explanatory diagram of a second embodiment of the invention showing the displacement of and the forces acting upon two accelerometer type inclinometers arranged according to the present invention;

FIG. 7 is a partial schematic diagram of a modified form of the circuit of FIG. 5, and FIG. 8 is a schematic block diagram of an accelerometer type inclinometer useful in the embodiments of FIGS. 6 and 7.

Figure 1:
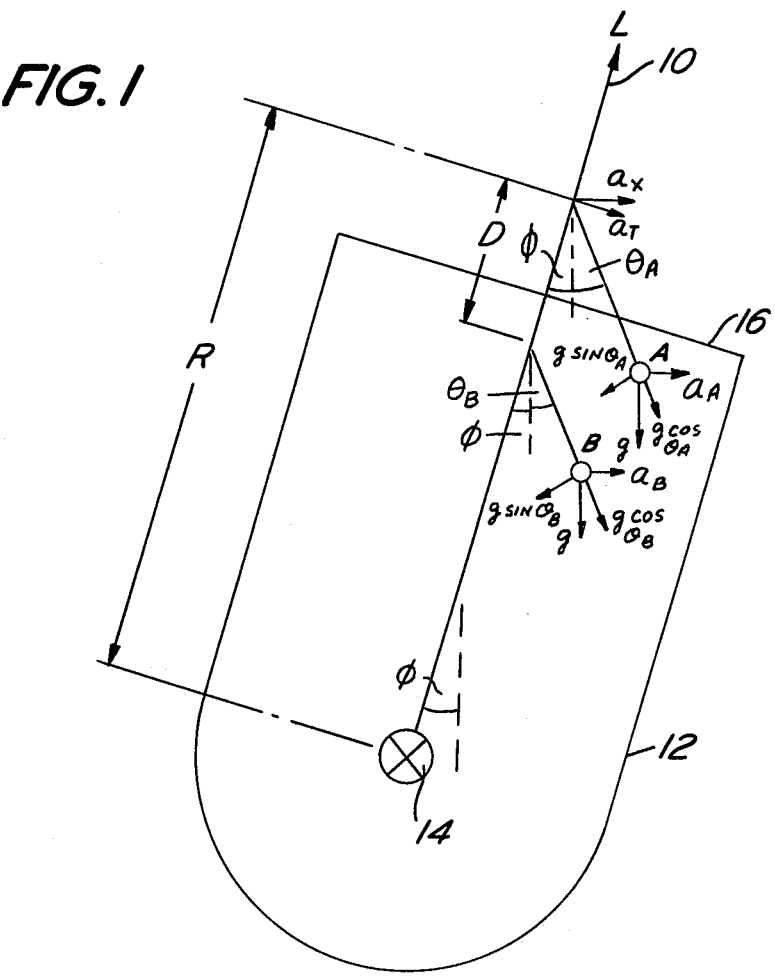
FIG. 1 is an explanatory diagram of a first embodiment of the invention showing the displacement of and the forces acting upon two pendulums arranged according to the present invention.

Referring now to the drawings, there is shown in FIG. 1 a first embodiment of the invention which includes a pair of short period pendulums A and B suspended from an upright support 10 mounted on a floating vessel such as a ship or buoy 12. Pendulums A and B are mounted on the vertical support 10 at distances R and R—D, respectively, from the center of gravity 14 of the vessel 12. While not shown, it should be understood that a platform or the like is mounted on the deck 16 of vessel 12 and antennae are mounted on the platform. The present invention is used to maintain the platform and therefore the antennae in a predetermined angular position with respect to the true vertical direction regardless of the movements of the vessel 12. In order to accomplish this, it is necessary to determine the angle $\Phi$, which angle represents the amount that the vessel 12 has rolled. However, as shown in FIG. 1, when the vessel 12 rolls through $\Phi$, pendulum A moves a distance $\Phi + \theta_A$. This quantity is the result of two factors: the actual movement of the vessel 12 and therefore the support 10 and the acceleration of the pendulum caused by the fact that it is suspended from support 10 at a distance above the center of gravity 14. Accordingly, if the angular movement of pendulum A is measured it can be seen that this measured angle which will be referred to as the apparent roll angle will differ from the actual angle of roll $\Phi$ by an amount $\theta_A$. Thus, if $\theta_A$ can be determined, then this information can be used to derive the desired quantity $\Phi$.

The following analytical analysis of the system shown in FIG. 1 will demonstrate how the instant invention is used to determine the quantity $\theta_A$ in a pendulum system.

As the vessel 12 rolls, it becomes angularly displaced from the true vertical by an amount $\Phi$. Angle $\Phi$, therefore, represents the roll position and $\ddot{\Phi}$ represents the angular roll acceleration. Accordingly, the tangential acceleration parallel to the deck 16 is $$a_T = \ddot{\Phi} L \quad (1)$$

where $L$ is the distance to the center of roll 14, and the acceleration in the horizontal direction due to roll is therefore $$a_X = a_T \cos \Phi = \ddot{\Phi} L \cos \Phi \quad (2)$$

Assuming small angles of roll, $\cos \Phi \cong 1$ and $\sin \Phi \cong \Phi$, in radians then equation (2) becomes $$a_X = \ddot{\Phi} L$$

If the two pendulums A and B are supported at distances R and R—D, respectively, from the center of roll 14, then from equation (3) their respective accelerations in the horizontal direction due to the roll of the vessel 12 are $$a_A = \ddot{\Phi} R \text{ and} \quad (4)$$
$$a_B = \ddot{\Phi}(R-D), \text{ respectively.} \quad (5)$$

Since the roll of the vessel 12 is relatively slow, and in view of the fact that the pendulums are mounted on or near the same vertical plane as the center of roll 14, the acceleration in the vertical direction due to the vessel's roll is negligible compared to the gravitational accelerations g and can therefore be ignored.

These gravitational accelerations g on the pendulums are shown in FIG. 1 and each is represented as a combination of two components: $g \cos \theta_A$ or $g \cos \theta_B$ acting along the line of the pendulums and $g \sin \theta_A$ or $g \sin \theta_B$ acting perpendicular to the first components and tending to restore the pendulums to the true vertical position. Since $\theta_A$ and $\theta_B$ are small, the components $g \sin \theta_A$ and $g \sin \theta_B$ can be appxomated by $g \theta_A$ and $g \theta_B$ and can be considered to be acting directly against the lateral accelerations $a_A$ and $a_B$ respectively.

In addition, the vessel's roll is slow enough (typically 10 seconds) to allow the pendulums A and B to reach steady state conditions with respect to these lateral accelerations. As a result, the following steady state relations are true:

$$a_A = g \theta_A \text{ or} \quad (6)$$
$$\theta_A = 1/g \, a_A \quad (6a)$$
$$a_B = g \theta_B \text{ or} \quad (7)$$
$$\theta_B = 1/g \, a_B \quad (7a)$$

Letting $\Delta\theta = (\theta_A - \theta_B)$ and substituting equations (6a) and (7a), then $$\Delta\theta = 1/g \, (a_A - a_B). \quad (8)$$

Further substiting equations (4) and (5) yields $\Delta\theta = 1/g \, \ddot{\Phi} [R-(R-D)]$ or $$\Delta\theta = 1/g \, \ddot{\Phi} D. \quad (9)$$

If $\Delta\theta$ is multiplied by $R/D$ then equation (9) becomes $$\Delta\theta \, (R/D) = 1/g \, \ddot{\Phi} R. \quad (10)$$

Substituting from equation (4) yields $$\Delta\theta \, (R/D) = 1/g \, a_A \quad (11)$$

Which is identical to equation (6a). Accordingly, we have the relationship $$\Delta\theta \, (R/D) = \theta_A. \quad (12)$$

Having found a means for deriving the quantity $\theta_A$, all that remains is to subtract this quantity from the directly measurable quantity $\Phi + \theta_A$ in order to arrive at the desired quantity $\Phi$.

Figure 2:
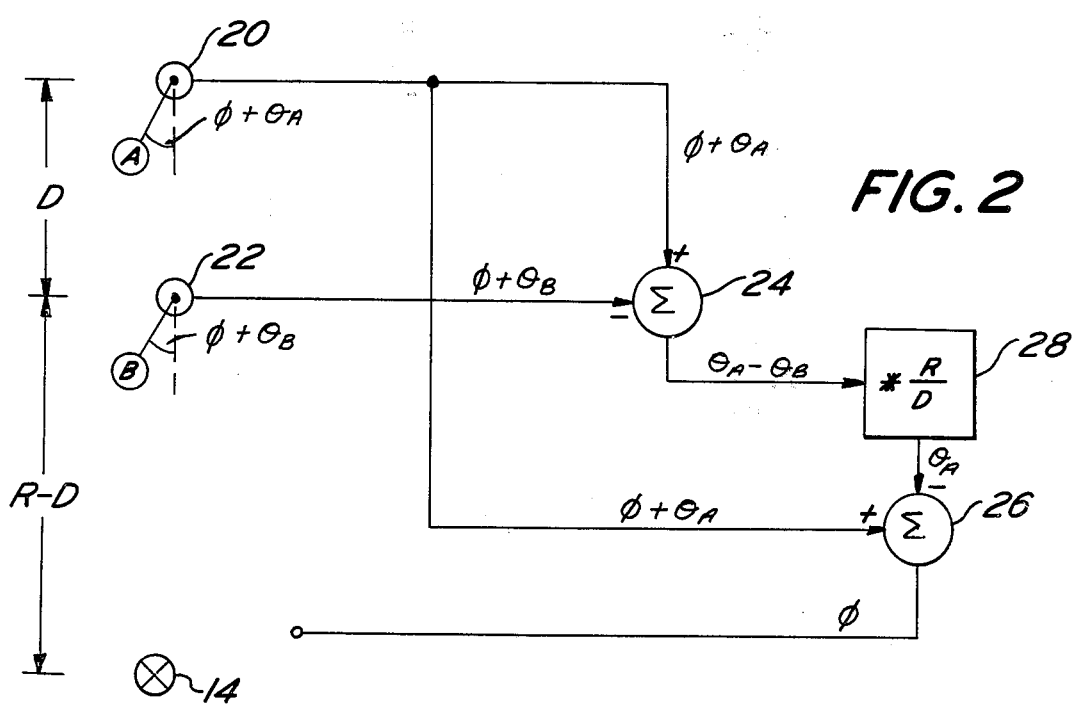
FIG. 2 is a schematic block diagram of a computing circuit used to perform the arithmetic operations required in practicing the present invention.
Figure 3:
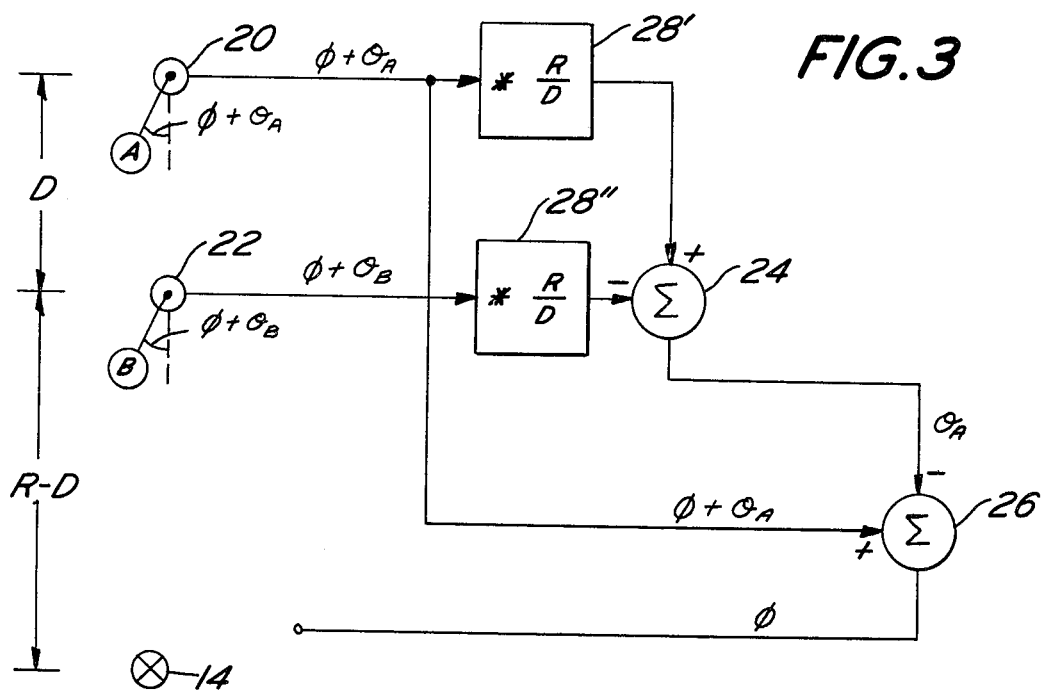
FIG. 3 is a schematic block diagram illustrating a modified form of FIG. 2.
Figure 4:
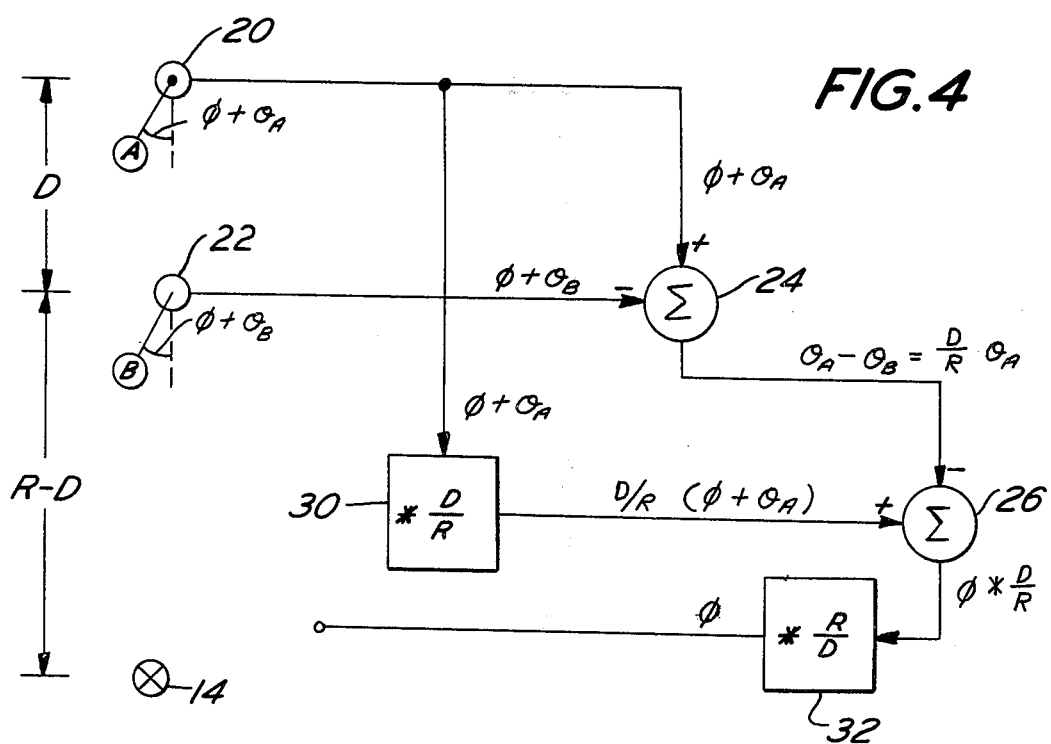
FIG. 4 is a schematic block diagram illustrating another modified form of FIG. 2.

FIGS. 2–4 schematically illustrate block diagrams of various circuits for performing the above described arithmetic operations. In the various figures like numerals are used to indicate like elements. Referring to these figures, pendulums A and B are supported by the wiper arms of potentiometers 20 and 22, respectively, which are mounted at vertical distances R and R—D, respectively, above a horizontal axis passing through the center of gravity or center of roll 14. When the pendulums move in a plane perpendicular to this axis, as a result of the vessel's roll and the lateral accelerations, signals A and B are generated at the outputs of potentiometers 20 and 22 which are proportional to the angles $\Phi + \theta_A$ and $\Phi + \theta_B$, respectively. It should be noted that while potentiometers are specifically described for measuring the angular movements of the pendulums, this is by way of illustration only and various other mechanical to electrical transducers could obviously be used in place of the potentiometers 20 and 22.

In the embodiment shown in FIG. 2, the output A from potentiometer 20 is fed to the plus terminal of summer 24 and the output B of potentiometer 22 is fed to the minus terminal of summer 24. The output of this summer is (A-B) which is equivalent to $\theta_A - \theta_B$ is then multiplied by the quantity $R/D$ in multiplier 28 to yield $(R/D)(A-B)$ or $(R/D)(\theta_A-\theta_B)$. According to equation (12) above, this results in the quantity $\theta_A$. This signal is then applied to the minus terminal of summer 26. In addition, the output A, i.e. $\Phi + \theta_A$, from the potentiometer 20 is connected to the plus input of summer 26. The output of summer 26, therefore, becomes $A-\lambda$ $(A-B)(R/D)$ or $A(1-R/D) + BR/D$ which equals the desired quantity $\Phi$. This signal can now be used in conjunction with a servo control mechanism to control the movement of the antennae relative to the vessel 12.

FIG. 3 is a schematic block diagram showing a modified form of the system of FIG. 2. In this embodiment, the multiplier 28 of FIG. 2 has been removed from the output of summer 24 and has been replaced by two similar multipliers 28' and 28'' which are connected to the two inputs of summer 24. The output from summer 24 is therefore connected directly to the minus input of summer 26. It should be readily apparent that the circuit of FIG. 3 having the multipliers at the input of summer 24 rather than at the output thereof is the exact equivalent of the circuit of FIG. 2 since a constant times the sum of addends is equal to the sum of that constant times each of the addends.

A second modified form of the system of FIG. 2 is shown in the schematic block diagram of FIG. 4. In this embodiment the multiplier 28 of FIG. 2 has also been removed from the output of summer 24. In lieu of multiplier 28, a multiplier 30 having a multiplication factor of $D/R$ is connected to the plus input terminal of summer 26. Accordingly, as shown in FIG. 4 the input to the plus terminal of summer 26 becomes $D/R(\Phi + \theta_A)$ and the input to the minus terminal is $\theta_A - \theta_B$ which, from equation (12), is equal to $\theta_A D/R$. The output of summer 26 is therefore $\Phi D/R$. In order to remove the factor $D/R$, a second multiplier 32 having a multiplication factor of $R/D$ is connected to the output of summer 26. This yields the desired quantity $\Phi$. It can be seen that each of the above described circuits provides an output which is $A(1-R/D) + BR/D$ where $A$ and $B$ are the outputs of potentiometers 20 and 22, respectively.

While FIGS. 2-4 illustrates three forms of the invention, various other arrangements will be obvious to those skilled in the art. For example, it will be recalled from equation (9) above that $g\Delta\theta = \Phi D$, and from equation (3) it can be seen that this is the lateral acceleration which would act on a pendulum positioned at a distance D from the center of roll 14. Thus, equation (9) can also be expressed as $\Delta\theta = 1/g\ a_D$. In comparing this with equations (6)-(7a) it can be seen that $\Delta\theta = \theta_D$. This is the angular error which would be present in a pendulum positioned at a distance D from the center of roll. Accordingly, if a third pendulum were suspended from a third potentiometer positioned at a distance D from the center of roll 14, the angle $\Phi$ could be determined by finding the difference between the outputs of the first two potentiometers and then subtracting this difference from the output of the third potentiometer.

In lieu of the third pendulum and potentiometer, it is also possible to simply position pendulum B at a distance D from the center of gravity 14 to accomplish the same results. With this arrangement, the outputs from potentiometers 20 and 22 would be subtracted and the difference would then be subtracted from the output of potentiometer 22. This also would result in the angle $\Phi$.

Neither of the last two systems described requires any multiplication factors. However, as a result of this, the systems do not have the flexibility of the embodiments shown in FIGS. 2-4. This is due to the fact that no multipliers are used and therefore once the potentiometers are positioned at the proper distances from the center of roll, they cannot be moved. On the other hand, the potentiometers and therefore the pendulums of the systems shown in FIGS. 2-4 can be freely moved to different positions spaced from the center of roll 14 as long as the multipliers are adjusted to the proper corresponding multiplying factors.

Figure 5:
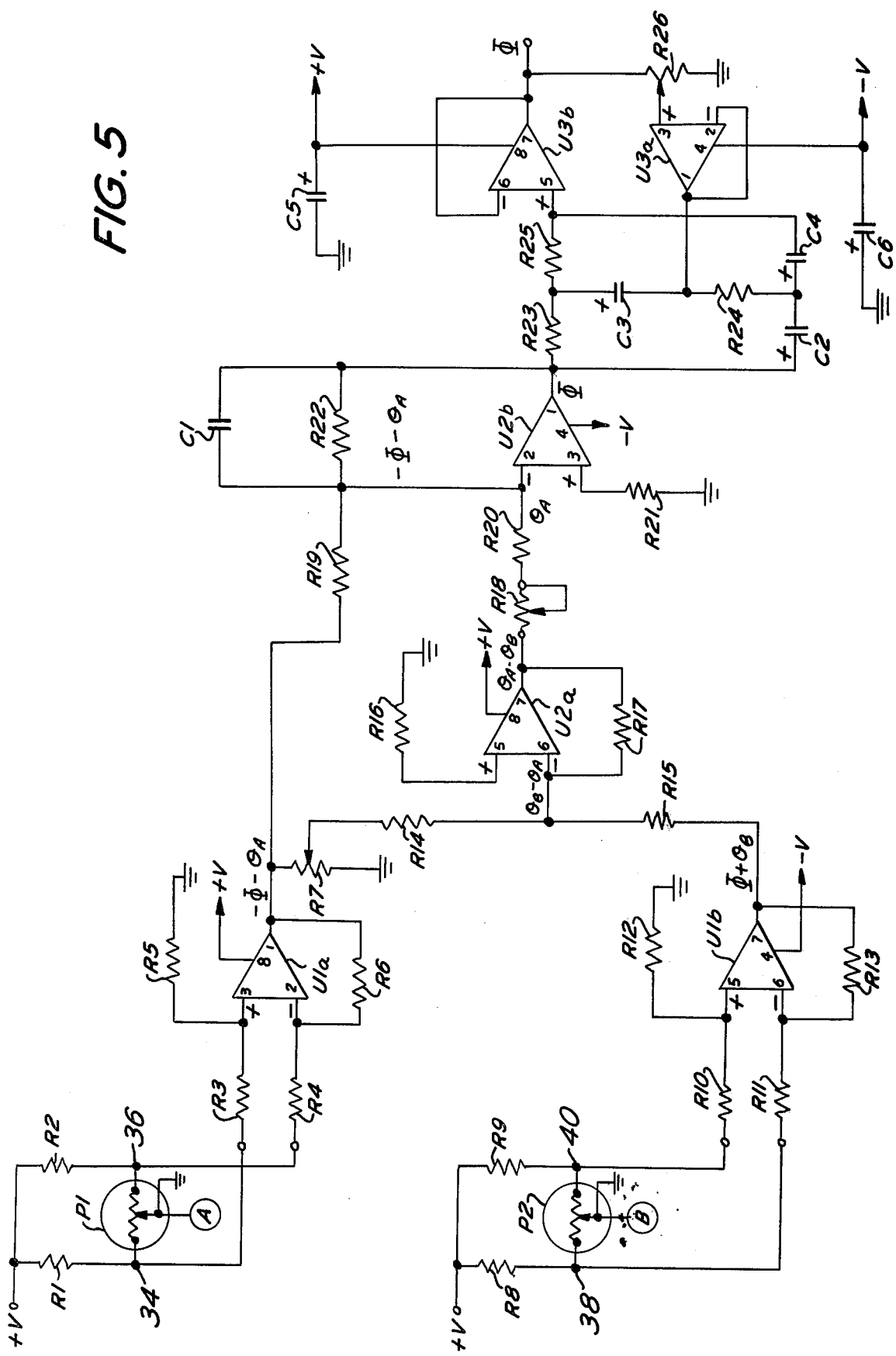
FIG. 5 is a schematic diagram of an electronic circuit for practicing the present invention and employing pendulums as inclinometers.

One example of a practical circuit for carrying out the present invention is shown schematically in FIG. 5. This circuit comprises two resistance bridges: resistors R1, R2 and potentiometer P1; and resistors R8, R9, and potentiometer P2. Pendulums A and B are suspended from the wiper arms of potentiometers P1 and P2, respectively, so that as the pendulums are pivoted, the wiper arms are caused to move a corresponding amount across the potentiometers. In addition, each of the wiper arms is electrically connected to ground. As a result, when each pendulum moves from the center position shown in FIG. 5, a potential imbalance is created at output terminals 34 and 36 of potentiometer P1 and at output terminals 38 and 40 of potentiometer P2.

In order to determine the magnitudes of these imbalances, terminals 34 and 36 of potentiometer P1 are connected to a first differential amplifier and terminals 38 and 40 of potentiometer P2 are connected to a second differential amplifier. The first differential amplifier comprises an operational amplifier U1a, input resistors R3, R4, resistor R5 connected between the positive terminal and ground and a feed back resistor R6. The second differential amplifier is similarly constructed and comprises an operational amplifier U1b, input R10, R11, resistor R12 connected to ground, and feedback resistor R13. Since these differential amplifiers are arranged to determine the imbalance across potentiometers P1 and P2, the output of operational amplifier U1a is proportional to the angular displacement of pendulum A and the output of operational amplifier U1b is proportional to the angular displacement of pendulum B. However, as shown in FIG. 5, the connections between potentiometer P1 and the first operational amplifier are exactly reversed from the connections between potentiometer P2 and the second operational amplifier. As a result, the sign of the output of amplifier U1a will always be opposite to the sign of the output of amplifier U1b. These outputs which represent the angular displacements of pendulums A and B are shown in FIG. 5 as $-\Phi - \theta_A$ and $\Phi + \theta_B$, respectively.

The output from operational amplifier U1a is connected to a variable resistor R7 which is adjusted to compensate for any errors which may be caused by inherent differences between potentiometers P1 and P2 or between the first and second differential amplifiers. Thereafter, the two output signals pass through input resistors R14 and R15 respectively and are combined at the negative input terminal of operational amplifier U2a. Operational amplifier U2a is arranged as an inverter amplifier which also includes resistor R16 connected to ground and feedback resistor R17. The output of operational amplifier U2a is, therefore, proportional to the negative of its input. Accordingly, since the input to operational amplifier U2a is $\theta_B - \theta_A$, the output is proportional to $\theta_A - \theta_B$. This output is then connected to the negative input terminal of operational amplifier U2b via resistors R18 and R20. Also connected to this input terminal, via resistor R19, is the output from operational amplifier U1a. The positive input terminal of operational amplifier U2b is connected to ground through resistor R21.

As is known in the art, the amplification factor of an operational amplifier depends on the value of its feedback resistor and its input resistors. Accordingly, input resistors R18 and R20 can be used to scale the output of operational amplifier U2a which is applied to operational amplifier U2b. Thus, the scale factor $R/D$ is introduced at this point by properly selecting the values of resistors R18 and R20 relative to input resistor R19 and feedback resistor R22. This operation is facilitated by making one of the input resistors such as resistor R18 variable. Furthermore, since resistor R18 is variable the scale factor $R/D$ can be changed whenever the positions of the pendulums relative to the center of gravity are changed. Thus, while the output of operational amplifier U2a is proportional to $\theta_A - \theta_B$, the actual signal added at the input of operational amplifier U2b is $\theta_A$. As shown in FIG. 5, this signal is added to the output signal $-\Phi -\theta_A$, from operational amplifier U1a whereby the resultant input to operational amplifier U2b is $-\Phi$. The output of operational amplifier U2b, arranged as an inverter amplifier, therefore is proportional to $\Phi$.

The circuit thus far described is capable of deriving a signal which is proportional to $\Phi$, the actual angular displacement from the vertical of a rolling vessel. It has been found, however, that in many practical applications the output of operational amplifier U2b may not be exactly proportional to the quantity $\Phi$. Furthermore, it has been found that the discrepancy between the actual value $\Phi$ and the value derived by the circuit of the present invention is due to spurious signals resulting from shock and vibrations. As stated above, the first and second differential amplifiers sense an imbalance of the bridges due to movements of the pendulums. While it is true that the pendulums will move as the vessel rolls, various other occurrences may also cause the pendulum to move. Thus, if the vessel, the pendulum supports, or even the pendulums are suddenly struck or jarred, or subjected to some vibratory forces the pendulums will move and may give the appearance that the vessel is rolling. In addition, once the pendulums begin to move they will continue to vibrate at their natural frequency.

In order to correct for these errors, the circuit of FIG. 5 includes a capacitor C1 connected across the feedback resistor R22 of operational amplifier U2b. This capacitor C1 functions as a low pass filter allowing signals having a frequency under, for example, 6 Hertz to pass through while filtering out all signals above 6 Hertz.

In addition, the output of operational amplifier U2b is connected to a notch filter which is tuned to the natural frequency of the pendulums. This filter comprises resistors R23 and R25 which are connected to the plus input of operational amplifier U3b. The output of operational amplifier U3b is then connected via potentiometer R26 to the plus input of operational amplifier U3a. The output of operational amplifier U3a is connected to the junction of a resistor R24 and capacitor C3. The other side of capacitor C3 is connected to the junction of resistors R23 and R25 and the other side of resistor R24 is connected to the junction of capacitors C2 and C4. Capacitor C2 is also connected to the output of operational amplifier U2b and capacitor C4 is connected to the plus input of operational amplifier U3b. Each of the operational amplifiers U3a and U3b also has its output connected directly back to the minus input of the amplifier and the amplifiers are supplied with power at terminals which are connected to ground bia capacitors C5 and C6, respectively. The notch filter shown in FIG. 5 is tuned in the known manner to the natural frequency of the pendulums P1 and P2. As a result of this circuit, the output of operational amplifier U3b, which is also the output of the entire circuit, is directly proportional to $\Phi$ and does not include any spurious signals which may have been introduced into the system as a result of shocks or vibrations.

The values of the various components used in the circuit of FIG. 5 are shown in the table below. It should be noted, however, that these values merely represent the preferred embodiment of the invention and that various other components and circuit arrangements could obviously be substituted without departing from the spirit and scope of the instant invention.

TABLE

| R1 = 2.2K | R10 = 200K | R19 = 33K |
|---|---|---|
| R2 = 2.2K | R11 = 100K | R20 = 2.2K |
| R3 = 200K | R12 = 200K | R21 = 10K |
| R4 = 100K | R13 = 100K | R22 = 56K |
| R5 = 200K | R14 = 10K | R23 = 5K |
| R6 = 100K | R15 = 10K | R24 = 2.5K |
| R7 = 5K | R16 = 3.9K | R25 = 5K |
| R8 = 2.2K | R17 = 18K | R26 = 5K |
| R9 = 2.2K | R18 = 50K | |
| C1 = 0.5 ufd | | C4 = 10 ufd |
| C2 = 10 ufd | | C5 = 10 ufd |
| C3 = 20 ufd | | C6 = 10 ufd |
| U1a and U1b = Motorola MC 1558G | | |
| U2a and U2b = Motorola MC 1558G | | |
| U3a and U3b = Motorola MC 1558G | | |

The invention as described above with reference to FIGS. 1–5 provides an accurate yet inexpensive vertical reference device. If higher accuracy is desired pendulums A and B in the above described systems can be replaced by more accurate types of inclinometers. While such devices will increase the cost of the system, they may be desirable where increased accuracy is required.

FIG. 6 is an explanatory diagram similar to FIG. 1 but wherein the pendulums A and B have been replaced by accelerometer type inclinometers 50 and 51, respectively. These inclinometers, which will be described in greater detail below, are basically accelerometers which have frequency responses that extend to DC. As a result, they are sensitive to the acceleration due to gravity and the acceleration due to the movement of support 10. Each inclinometer 50 and 51 has a sensitive axis 52 and 52' and generates an output signal which is proportional to any accelerations along the sensitive axis.

The outputs of inclinometers 50 and 51 can, therefore, be expressed as follows:

$$A_{50} = g \sin \Phi + \ddot{\Phi}R \text{ and} \quad (13)$$
$$A_{51} = g \sin \Phi + \ddot{\Phi}(R-D), \text{ respectively} \quad (14)$$

Where $g \sin \Phi$ is equal to the component of the gravitational acceleration along the sensitive axis and $\ddot{\Phi}R$ and $\ddot{\Phi}(R-D)$, respectively, are the tangential accelerations on the inclinometers 50 and 51 taken from equation (1) above.

Assuming small angles of roll, $\sin \Phi$ is approximately equal to $\Phi$, in radians and equations (13) and (14) become $$A_{50} = g\Phi + \ddot{\Phi}R \text{ and} \quad (15)$$
$$A_{51} = g\Phi + \ddot{\Phi}(R-D), \text{ respectively.} \quad (16)$$

Letting $\Delta A = (A_{50} - A_{51})$ and substituting equations (15) and (16), then $$\Delta A = \ddot{\Phi} D \quad (17)$$

If $\Delta A$ is multiplied by $R/D$ then equation (17) becomes $$\Delta A(R/D) = \ddot{\Phi}R \quad (18)$$

Subtracting equation (18) from equation (15) yields $$A_{50} - \Delta A(R/D) = g\Phi \quad (19)$$

Which is equal to the desired quantity $\Phi$ multiplied by the constant $g$.

It should readily be apparent that the mathematical operations described above are precisely those performed by the computing circuits shown in FIGS. 2–4. Accordingly, in order to adapt those circuits to be used with accelerometer type inclinometers, all that is necessary is to replace pendulums A and B and potentiometers 20 and 22 with inclinometers 50 and 51 respectively. The output of the circuits shown in FIGS. 2–4 would then become $\Phi$ multiplied by the constant $g$. This constant $g$ could, of course, be easily removed if desired.

It should also be readily apparent that the circuit shown in FIG. 5 can easily be modified to accept inclinometers 50 and 51 in lieu of the pendulums A and B. This modification is shown in FIG. 7. As can be seen in this Figure, the output from inclinometer 50, which is the higher of the two inclinometers, is connected to the minus input of operational amplifier U1a through resistor R4, resistor R3 being removed from the circuit. Similarly, the output from inclinometer 51 is connected to the plus input of operational amplifier U1b through resistor R10. Resistor R11, connected to the minus input of operational amplifier U1b, is then connected to ground. The remaining parts of the circuit of FIG. 7 are the same as those shown in FIG. 5 and are therefore not specifically shown in FIG. 7.

One form of an accelerometer type inclinometer such as 50 or 51 is shown in FIG. 8. This inclinometer is a conventional pendulus force-balance accelerometer which includes a pendulum or seismic mass 54 which is free to pivot about axis 56. Accelerations along the sensitive axis 52 of the device produce a torque on the mass 54 which tends to deflect the mass. A position detector 58, which is comprised of an oscillator circuit and an inductive pick-off coil, converts the amount of deflection of the mass into a proportional voltage signal. This signal is then amplified by amplifier 60 and is fed back to a restoring coil 62 associated with the mass 54. This feedback signal from amplifier 60 provides power to the restoring coil 62 which develops a restoring force equal and opposite to the original force on the mass 54 caused by the acceleration. As a result, the mass 54 is restrained very close to its null position. The feedback current flowing through resistor R64, which is in series with the restoring coil 62, provides an output voltage which is proportional to the input acceleration.

Pendulus force-balance accelerometers such as described above are extremely accurate and are therefore preferred forms of inclinometers 50 and 51. However, various other accelerometers could also be used. In fact, substantially any accelerometer which is sensitive to both the acceleration due to gravity and the accelerations caused by the angular movement of the vessel can be used as an inclinometer with the present invention.

While the instant invention has been described with specific reference to the angular displacement of a ship or buoy due to its roll, it should be obvious that the invention is equally useful for determining the amount of pitch which a ship or buoy has undergone. In addition, it is also possible to utilize two complete systems such as described above on a single ship or buoy in order to determine the amount of roll and pitch simultaneously.

Furthermore, the present invention has been described as having both inclinometers mounted directly above the center of gravity of the ship or buoy. This is, of course, the preferred arrangement since as a practical matter it is the most convenient place to arrange the inclinometers. However, it should be readily apparent to those skilled in the art that the invention could also be easily modified so that the inclinometers could be mounted below the center of gravity or at some angle from the vertical plane of the ship or buoy.

The present invention may be embodied in other specific forms without departing from the spirit or essential attributes thereof and, accordingly, reference should be made to the appended claims, rather than to the foregoing specification as indicating the scope of the invention.

I claim:

1. A vertical reference device comprising:
   first and second pendulum means mounted on a body which is susceptible to angular motion about a horizontal axis, said first and second pendulum means being mounted at different vertical distances from said axis;
   transducer means for generating signals proportional to the angular positions of said first and second pendulum means;
   means for combining said signals and multiplying the same by a predetermined factor whereby said device can generate a signal proportional to the actual angular position of said body about said axis.

2. A vertical reference device comprising first and second inclinometer means, each of said inclinometer means having a sensitive plane associated therewith, said first inclinometer means including a transducer means for generating a first signal in response to angular movement of said first inclinometer means within its sensitive plane, said second inclinometer means including a transducer means for generating a second signal in response to angular movement of said second inclinometer means within its sensitive plane;
   said first and second inclinometer means being mounted on a body which is susceptible to angular movement about a horizontal axis;
   said first and second inclinometer means being mounted on said body at different vertical distances from said axis and being arranged to have their sensitive planes perpendicular to said axis, and
   means for comparing said first and second signals from said transducer means to each other and means responsive to said comparison for generating a signal proportional to the actual angular position of said body.

3. A vertical reference device as claimed in claim 2 wherein said means for comparing said signals comprises means for creating a third signal proportional to the difference between said first and said second signals.

4. A vertical reference device as claimed in claim 3 wherein said means responsive to said comparison comprises means for multiplying one of said first and third signals by a predetermined factor thereby creating a fourth signal and means for determining the difference between said fourth signal and the other of said first and third signals.

5. A vertical reference device as claimed in claim 4 wherein said first inclinometer means is further from said axis than said second inclinometer means and wherein said predetermined factor is proportional to $R/D$, where $R$ is the vertical distance from said first inclinometer means to said axis and $D$ is the vertical distance between said inclinometer means.

6. A vertical reference device as claimed in claim 3 wherein said first and second inclinometer means comprises first and second pendulums and wherein said signals generated by said transducer means are proportional to the angular positions of said pendulums.

7. A vertical reference device as claimed in claim 3 wherein said first and second inclinometer means comprises first and second accelerometers.

8. A vertical reference device as claimed in claim 5 wherein said first and second inclinometer means comprises first and second pendulums and wherein said signals generated by said transducer means are proportional to the angular positions of said pendulums.

9. A vertical reference device as claimed in claim 5 wherein said first and second inclinometer means comprises first and second accelerometers.

10. A vertical reference device comprising:
   first and second inclinometer means mounted at different vertical distances from the center of gravity of a vessel;
   means for generating a first signal proportional to the angle measured by said first inclinometer means and a second signal proportional to the angle measured by said second inclinometer means;
   means for creating a third signal proportional to the difference between said first and second signals;
   means for creating a fourth signal proportional to the difference between said third signal and one of said first and second signals;
   and means for multiplying one of said first, second and third signals by a predetermined scale factor whereby said fourth signal will be proportional to the actual angular position of said ship.

11. A vertical reference device as claimed in claim 10 wherein at least one of said inclinometer means is a pendulum.

12. A vertical reference device as claimed in claim 10 wherein at least one of said inclinometer means is an accelerometer.

13. A vertical reference device comprising:
   first and second inclinometer means mounted on a body which is susceptible to angular movement about a horizontal axis;
   said first and second inclinometer means being mounted at different vertical distances from said axis and including first and second transducer means, respectively, for generating first and second signals, respectively, in response to said angular movement of said body;
   means responsive to said signals for generating an output which is proportional to $A(1-R/D) + BR/D$, wherein:
   A is said first signal;
   B is said second signal;
   R is the vertical distance from said first inclinometer means to said axis, and
   D is the vertical distance between said inclinometer means.

14. A vertical reference device as claimed in claim 13 wherein said first and second inclinometer means comprises first and second pendulums and wherein said signals generated by said transducer means are proportional to the angular positions of said pendulums.

15. A vertical reference device as claimed in claim 13 wherein said first and second inclinometer means comprises first and second accelerometers.

* * * * *